Figure 1:
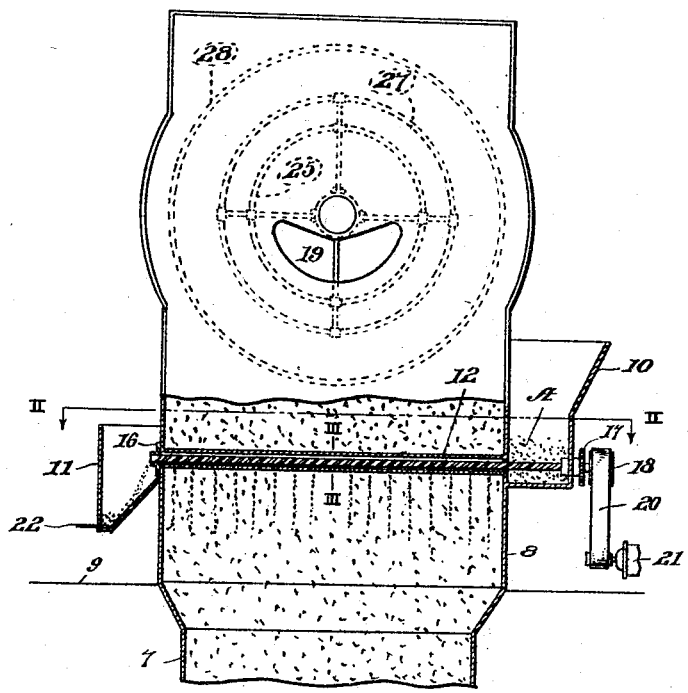

L. T. FREDERICK.
MICA BUILDING MACHINE.
APPLICATION FILED NOV. 5, 1919.

1,411,690.

Patented Apr. 4, 1922.

Inventor
L. T. Frederick

UNITED STATES PATENT OFFICE.

LOUIS T. FREDERICK, OF VALPARAISO, INDIANA.

MICA-BUILDING MACHINE.

1,411,690.   Specification of Letters Patent.   Patented Apr. 4, 1922.

Application filed November 5, 1919. Serial No. 335,880.

*To all whom it may concern:*

Be it known that I, LOUIS T. FREDERICK, a citizen of the United States, residing at Valparaiso, in the county of Porter and State of Indiana, have invented new and useful Improvements in Mica-Building Machines, of which the following is a specification.

The primary object of the present invention resides in the provision of a mica building machine wherein mica is fed in flake form into the upper end of a tower and has particular reference to the feeding of a binding material in powdered form such as dried shellac or any desired form of adhesive, it being understood that it is not the intention to limit this application to the character of adhesive employed.

A further object of the invention resides in the employment of devices for feeding the powdered bond transversely of the tower and for even distribution in the tower, while means is employed to gather an excess feed of the bonding material at the opposite side of the tower for restoration to the feed hopper.

The invention in its entirety is disclosed in application filed September 18, 1919, Serial No. 324,331, and also in an application filed on even date herewith, the present invention relating to changes and improvements in the art and modifications of the devices referred to.

With the above objects in view, the invention consists in the novel combination and arrangement of parts, herein fully described and shown in the accompanying drawings wherein like reference characters indicate similar parts throughout the several views.

Figure 2:
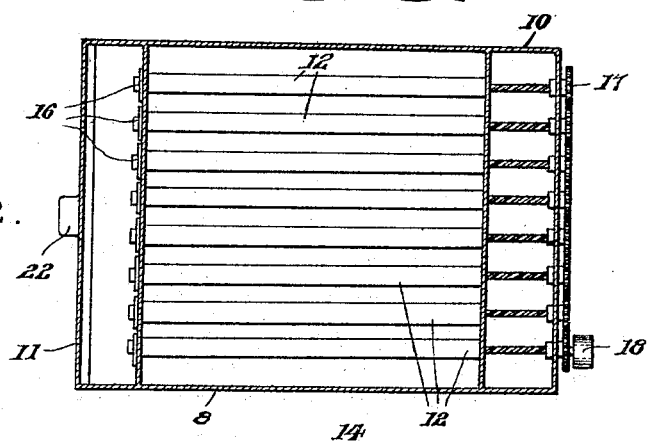
Figure 3:
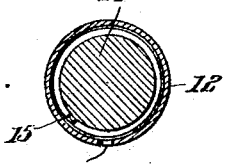

In the drawings,

Figure 1 is a side elevational view of the upper end of a mica building tower, with a portion of the same shown in section to illustrate the mica feeding devices, Figure 2 is a horizontal sectional view taken on line II—II of Figure 1 showing the plurality of feed devices and the driving connections between the same, and, Figure 3 is a cross sectional view taken on line III—III of Figure 1 illustrating one of the feed tubes and the feed screw arranged therein.

In the formation of mica sheets, the mica in flake form is delivered into the upper end of a tower at which point the flakes are disintegrated and descend in the tower for reception upon a building plate positioned at the lower end thereof while the flakes in falling controlled by the law of average seek an even level upon the building plate. As distinguished from a mica sheet formed of alternate layers of mica flakes and adhesive, the present invention commingles the mica flakes and powdered bond adjacent the upper end of the tower immediately following the disintegrated step so that portions of the adhesive are picked up by the descending mica flakes and carried therewith to the building plate at the bottom of the tower whereby a mica sheet is formed of an even thickness with an intimate association of the mica flakes and powdered bond throughout the thickness of the sheet, while no attempt is made to build a sheet of alternate layers of mica flakes and powdered bond.

Referring more in detail to the accompanying drawing, there is illustrated a tower 7 having an enlarged upper section 8 arranged above the upper floor level 9. As shown by dotted lines in Figure 1, the casing 8 is provided with a side entrance opening 19 into which the mica flakes are to be delivered and received upon concentric screens 25, 27 and 28 arranged in the upper end of the tower section 8 for purposes of causing a complete disintegration of the mica flakes fed thereinto before being freely delivered into the tower 7.

In the present invention, a bonding material is delivered into the tower section 8 directly beneath the disintegrating screens for commingling with the mica flakes in suspension in the tower and to be carried thereby to a building plate located at the lower end of the tower, the bond feeding devices including a hopper 10 arranged at one side of the tower section 8 while an overflow hopper 11 is arranged diammetrically of the hopper 10. A plurality of tubular members 12 extend transversely of the tower section 8, any number desired being employed and having a single row of perforations 13 in the bottom side thereof as illustrated in Figures 1 and 3, the tubular members 12 communcating with the feed and overflow hoppers 10 and 11 respectively. A screw 14 embodying a spiral rib 15 freely extends through each tube 12, one set of adjacent ends of the screw 14 being journaled in bearings 16 in the overflow hopper 11 while the other set of screw ends project outwardly of the receiving hopper 10 and has a gear 17 secured thereon, the adjacent gears meshing as illustrated in Figure 2 while a pulley 18 is secured to one of the gears and has a belt connection 20 with a motor 21 and as illustrated in Figure 1.

From the above detailed description of the device it is believed that the construction and operation will be at once apparent, it being noted that a powdered bond such as A illustrated in the receiving hopper 10 in Figure 1 is placed in said hopper and is conveyed therefrom by the revolving screws 14 to the tubular members 12 to percolate through the perforations in the bottoms thereof as shown in stream lines in Figure 1 with the excess bond conveyed completely through the tube and into the overflow hopper 11 and when a sufficient quantity has been received in the overflow section 11, the same may be delivered therefrom by opening the trap 22 for returning to the receiving hopper 10. It will be observed that the bonding material A and the mica flakes are simultaneously fed into the tower for commingling while descending therein so that when the mica flakes are received in the building plates at the lower end of the tower, a mica sheet will be formed when treated of a substantially homogeneous mass as distinguished from layers of mica flakes adhesively connected together. It is not the intention of the present applicant to form a mica sheet of alternate layers of mica flakes and a bonding material to so associate the mica flakes and bonding material while being delivered onto the building plate that a mica sheet of mica flakes and a bonding material evenly distributed relative to each flake will result. Also, it is not intended to limit this invention to any number of feed tubes and screws as the number, and dimensions thereof may be readily varied, and while there is herein shown and described what is believed to be the preferable embodiment of this invention, it is nevertheless to be understood that minor changes may be made therein without departing from the spirit and scope of the same.

What is claimed as new is:—

1. In a machine of the type described, the combination with a tower, of means for feeding a bonding material transversely of the tower, said means including a plurality of tubular members extending transversely of said tower and having perforations in the lower sides thereof and means for feeding a bonding material through said tubular members.

2. In a machine of the type described, the combination with a tower, of means for feeding a bonding material transversely of the tower, said means including a plurality of tubular members extending transversely of said tower and having perforations in the lower sides thereof, and rotatable screws extending through said tubular member for feeding a bonding material therethrough.

3. In a machine of the type described, the combination with a tower, of means for feeding a bonding material transversely of the tower, said means including a plurality of tubular members extending transversely of said tower and having perforations in the lower sides thereof, screws for feeding a bonding material through said tubular members, a receiving hopper at one side of said tower through which the feed screws are journaled and driving connections for said feed screws.

4. In a machine of the type described, the combination with a tower, of means for feeding a bonding material transversely of the tower, said means including a plurality of tubular members extending transversely of said tower and having perforations in the lower sides thereof, feed screws for feeding a bonding material through said tubular members, a receiving hopper at one side of said tower through which the feed screws are journaled, driving connections for said feed screws, and an overflow hopper arranged at the side of the tower opposite the feed hopper having the feed screws projecting thereinto.

5. In a machine of the type described, the combination with a tower having flake disintegrating means arranged at the upper end thereof, of means for feeding a dry bond transversely of said tower, said means comprising a stationary element and an element rotatable therein for feeding the bonding material transversely of the tower.

In testimony whereof I have hereunto set my hand.

LOUIS T. FREDERICK